United States Patent Office 3,409,594
Patented Nov. 5, 1968

3,409,594
POLYMERCAPTALS OF AROMATIC DIMERCAPTANS AND FORMALDEHYDE
Manuel Slovinsky, Fanwood, N.J., assignor to Celanese Corporation, a corporation of Delaware
No Drawing. Filed Aug. 14, 1964, Ser. No. 390,268
7 Claims. (Cl. 260—67)

ABSTRACT OF THE DISCLOSURE

This disclosure comprises a description of polymeric mercaptals of aromatic dimercaptans and formaldehyde, which mercaptals are useful for producing fibers and molded products.

---

This invention relates to the production of polymeric mercaptals and relates more particularly to the production of mercaptals containing aromatic units.

It is an object of this invention to produce novel polymeric products useful for the production of fibers, molded products and other shaped articles.

Other objects of this invention will be apparent from the following detailed description and claims. In this description and claims all proportions are by weight unless otherwise indicated.

In accordance with one aspect of this invention there are produced polymeric mercaptals of an aromatic $\alpha,\alpha'$-dimercaptan and formaldehyde. These polymercaptals are advantageously produced by reacting the dimercaptan, having each —SH group attached to an aliphatic carbon, and formaldehyde, the latter being conveniently supplied to the reaction in the form of paraformaldehyde or as a monomeric formal.

A typical reaction using paraformaldehyde can be represented by the following equation, in which the dimercaptan is dimercaptomethyl benzene:

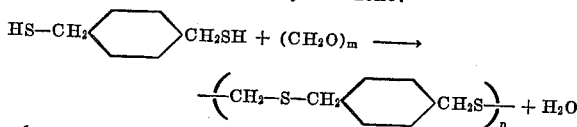

where $(CH_2O)_m$ represents paraformaldehyde, and $n$ is a number (e.g. above 10) representing the degree of polymerization of the resulting polymercaptal.

Compounds in which the two mercaptomethyl groups are attached to arylene radicals other than the phenylene radical shown in the above equation may be used, e.g. to give polymers of the general formula:

$$-(CH_2-R-CH_2-S-CH_2-S-)_n$$

where R is the arylene radical. Examples of such arylene nuclei are halogen or alkyl substituted phenylene, such as

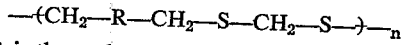

where X is halogen or alkyl, e.g. dichloro-, difluorotetrachloro-, tetrafluoro, dimethyl, dibutyl, tetramethyl or tetrabutyl; arylene radicals of the formulas

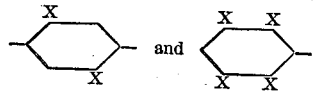

where Y is oxygen, sulfur, $SO_2$ or $CH_2$,

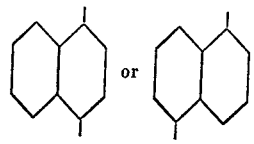

or arylene radicals in which one or more hydrogen atoms on the aromatic hydrocarbon rings of the above formulas have been replaced by substituents, e.g. alkyl or halogen substituents.

The production of the polymercaptal is usually effected under substantially anhydrous conditions in the presence of an acid-reacting condensation catalyst such as an alkane sulfonic acid, e.g. methane-sulfonic acid or higher homologues thereof; other sulfonic acids such as p-toluene sulfonic acid, camphor-sulfonic acids, polysulfonic acids like methane di- or tri-sulfonic acid, and naphthalenesulfonic acid; acid-acting salts e.g. ferric chloride, boron trifluoride and complexes thereof such as the dibutyl etherate or other etherates, stannic chloride; mineral acids such as sulfuric acid or hydrogen chloride; and other Lewis acids. The proportion of catalyst used in generally below 1.0% of the reaction mixture, preferably in the range of about 0.1 to 0.5%. When hydrogen chloride or other volatile catalyst is used, it is convenient to bubble the catalyst gradually into the reaction mixture. When the —$CH_2$— units are provided by paraformaldehyde, the water of reaction is conveniently removed, as by continuous azeotropic distillation in the presence of an inert solvent such as a hydrocarbon, which may be aromatic (e.g. benzene, toluene or xylene), cycloaliphatic (e.g. cyclohexane or methyl cyclohexane) or aliphatic (e.g. hexane, pentane, or octane). When a monomeric formal is used as the starting material in the production of the polymercaptal, the formation of water of reaction is avoided. Particularly suitable are dialkyl formals such as the formals of alkanols having 1 to 10 carbon atoms, e.g. di-n-butyl formal, or formals of other alcohols which are of sufficient volatility to be readily driven off during or after the partial polymerization of the polymercaptal.

Advantageously the proportions used are such as to provide approximately equal moles of the formaldehyde moiety and the dimercaptan and the reaction temperature as in the range of about 60 to 230° C.

The polymeric products obtained in accordance with this invention may be molded, as by injection or compression molding, to produce useful shaped articles, e.g. toys, cups, automobile parts, containers, etc., may be cast or extruded to produce films suitable for wrapping or packaging purposes, and may be melt-spun to produce useful textile fibers.

The following examples are given to illustrate this invention further.

Example I 51 parts of p-xylylene-$\alpha,\alpha'$-dimercaptan, 11.4 parts of paraformaldehyde, 228 parts of benzene and 0.18 parts of methane sulfonic acid were heated at 74° C. for 2.5 hours. The temperature was then raised to the boiling point (82° C.) and water by-product was caught in a Dean-Stark trap. After four hours boiling, 2 g. of paraformaldehyde were added, and boiling continued for an additional two hours.

Benzene was next removed by heating at increasingly higher temperature and vacuum up to 162° C. and 10 mm. Hg. The remaining white powder was washed twice with methanol containing tributylamine and twice with methanol and dried in a vacuum oven at 60° C. There was obtained in 88% yield a polymer having a crystalline melting point (disappearance of birefringence in a crossed Nicols hot stage microscope) of 159° C. and an inherent viscosity of 0.37, as determined in a 0.5% solution of the polymer in N,N-dimethyl acetamide at 130° C.

Fibers melt spun from the polymer (containing 1% of a phenolic stabilizer, such as 2,2'-methylene-bis (4-methyl, 6-tertiary butyl phenol) as a stabilizer) at 215° C. showed considerable strength after drawing to 3-5 times their original length. X-ray analysis showed that the polymer was crystalline. It was soluble in hot (>100° C.) dimethylsulfoxide, cyclohexanone, 1,1,2,2-tetrachloroethane, chlorobenzene, benzaldehyde.

In contrast, the polymercaptal from formaldehyde and hexamethylene dimercaptan is reported to have a melting point of only 69° C. as reported in British Patent 694,441. Also, unlike the polymercaptals of the British patent, the polymercaptal of the xylylene dimercaptan is substantially unaffected on treatment with hydrogen peroxide in formic acid in the manner described in that patent.

Example II 5.1 parts p-xylylene-α,α'-dimercaptan, 4.86 parts dibutyl formal and 0.014 part anhydrous ferric chloride were gradually heated up to a temperature of 124° C. Polymer formed after a few minutes at this temperature. After 2 hours the polymer was washed twice with methanol in a Waring blendor and dried. The crystalline melting point was 150° C. and the inherent viscosity (0.5% in N,N-dimethyl acetamide at 130° C.) was 0.14. Fibers could be drawn from the melt.

Example III 29.7 parts 2,5-bismercapto methyl-p-xylene, 5.7 parts paraformaldehyde, 0.088 part methane sulfonic acid, 158 parts sulfolane and 53 parts benzene were heated at about 70° C. for one hour. The temperature was next raised to 119° C. and distillation of water-benzene started, water being retained in a Dean-Stark trap. After two hours refluxing, 0.57 part paraformaldehyde were added and refluxing continued after 0.5 hour at 100° C. This was repeated once more. The reaction mixture was poured in methanol and washed once with methanol containing tributyl amine and then with pure methanol. The product obtained was crystalline by X-ray diffraction, had a crystalline melting point (disappearance of birefringence) of 215° C. and an inherent viscosity (0.5% in benzaldehyde at 130° C.) of 0.22. Fibers were drawn from the melt.

Example IV

Bismercapto methyl mesitylene was prepared by refluxing 108.5 g. (0.5 M) bischloromethyl mesitylene, 100 g. (1.32 M) thiourea and 66 ml. of wataer for two hours. A solution of 82.5 g. sodium hydroxide in 800 ml. of water was next added and refluxing continued for three additional hours. The cold reaction mixture was filtered and the clear solution acidified and extracted with ether. After washing the ether solution with water and drying with sodium sulfate, the ether was evaporated. The solid residue was distilled at 3.5 mm. Hg A. (B.P. 152–154° C.) and the distillate recrystallized from methanol. Analysis found, percent: C, 62.3; S, 30.2. Theoretical C, 62.4; S, 30.2. Melting point 68° C.

The polymercaptal from this dimercaptan and formaldehyde was prepared as follows: Bismercapto methyl mesitylene 21.2 g., paraformaldehyde 4.1 g., methane sulfonic acid 0.063 g. and benzene 155 ml. were heated at 72° C. for 1.5 hours. The temperature was next raised to reflux (80° C.) for 2¾ hours while the water produced was removed from the reaction mixture and caught in a Dean-Stark trap. Thereafter, 0.4 g. paraformaldehyde was added, the temperature was kept at 70° C. for 1.5 hours, and the reaction mixture was then refluxed for 1.5 hours; this series of steps was then repeated once more. The solvent was removed by heating up to a temperature of 165° C. and 20 mm. Hg A. The dry material was ground to pass a 40 mesh sieve and washed successively with benzene, methanol containing tributylamine and methanol. The product obtained was birefringent and crystalline by X-ray diffraction; it had a crystalline melting point (disappearance of birefringence) of 225° C. It was soluble in sulfolane above 145° C., hexamethyl phosphoramide above 95° C., diphenyl carbonate above 130° C. Fibers were spun from the melt.

It is to be understood that the foregoing detailed description is given merely by way of illustration, and that variations may be made therein without departing from the spirit of this invention.

The embodiments of the invention in which an exclusive property or privilege is claimed are defined as follows.

1. A polymercaptal of:
(A) an aromatic α,α'-dimercaptan represented by the formula $$HS-H_2C-R-CH_2-SH$$

wherein R is an arylene radical selected from the group consisting of phenylene,

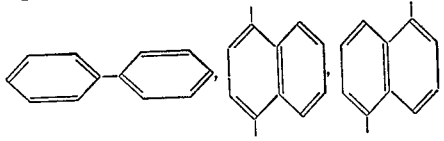

and

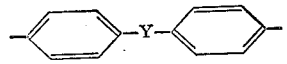

wherein Y is selected from the group consisting of oxygen, sulfur, $SO_2$, and $CH_2$; and
(B) formaldehyde;
said polymercaptal having repeating $$+S-CH_2-R-CH_2-S-CH_2+$$

units.

2. The polymercaptal of claim 1 wherein R is phenylene.
3. The polymercaptal of claim 1 wherein R is alkyl phenylene.
4. The polymercaptal of claim 1 wherein said aromatic α,α'-dimercaptan is bismercapto methyl mesitylene.
5. A filamentary material of the polymercaptal of claim 1.
6. A polymercaptal as set forth in claim 1 wherein said aromatic α,α'-dimercaptan is p-xylylene α,α'-dimercaptan.
7. A polymercaptal as set forth in claim 1 wherein said aromatic α,α'-dimercaptan is 2, 5-bismercaptomethyl.

References Cited

UNITED STATES PATENTS

| | | | |
|---|---|---|---|
| 2,533,764 | 12/1950 | Caesar et al. | 260—67 |
| 2,646,415 | 7/1953 | Patrick et al. | 260—48 |
| 2,986,582 | 5/1961 | Martin et al. | 260—609 |
| 3,068,294 | 12/1962 | Rosen et al. | 260—67 |
| 3,231,544 | 1/1966 | Cotman et al. | 260—67 |
| 3,256,245 | 6/1966 | Gutweiler et al. | 260—67 |
| 3,337,507 | 8/1967 | Gutweiler et al. | 260—67 |

FOREIGN PATENTS 1,166,426  11/1958  France.

WILLIAM H. SHORT, *Primary Examiner.*

L. M. PHYNES, *Assistant Examiner.*